V. M. GOLDSCHMIDT.
COMPOUND OF TITANIUM AND PROCESS FOR THE MANUFACTURE OF SAME.
APPLICATION FILED OCT. 12, 1917.

1,348,129. Patented July 27, 1920.

INVENTOR.
Victor Moritz Goldschmidt.
BY
ATTORNEY

UNITED STATES PATENT OFFICE.

VICTOR MORITZ GOLDSCHMIDT, OF CHRISTIANIA, NORWAY, ASSIGNOR, BY MESNE ASSIGNMENTS, TO TITAN CO. A./S., OF CHRISTIANIA, NORWAY.

COMPOUND OF TITANIUM AND PROCESS FOR THE MANUFACTURE OF SAME.

1,348,129. Specification of Letters Patent. Patented July 27, 1920.

Application filed October 12, 1917. Serial No. 196,327.

*To all whom it may concern:*

Be it known that I, VICTOR MORITZ GOLDSCHMIDT, a subject of Norway, and a resident of the city of Christiania, Kingdom of Norway, have invented certain new and useful Improvements in Compounds of Titanium and Processes for the Manufacture of Same, of which the following is a specification, this application being a continuation in part of my application Sr. No. 156,983 and of Sr. No. 156,984, both filed March 23, 1917.

This invention relates to compounds of titanium suitable for use as pigments although not confined thereto. The compounds either consist of titanium and oxygen exclusively or of these elements combined or mixed with other elements or compounds.

The object of the invention is an improved compound of the class above referred to and a process of producing the same either singly or mixed with other substances.

It is well known that efforts have been made for some time to produce white or light colored pigments from titanium compounds. Notwithstanding these efforts, however, no one has succeeded in establishing an industry based upon the manufacture of such pigments.

I have studied the problems in question for the purpose of ascertaining the circumstances which have rendered the use of titanium compounds for this purpose impractical. To make the problem in question clear, a general explanation of the character of pigments is given below.

A white or light colored pigment in order to be efficient should possess the following properties:

1. It should possess a strong hiding power, viz: it should hide or conceal the surface to be painted even when applied in quite a thin layer.

2. It should be of such a mechanical nature in regard to the size and form of its particles, that it is susceptible of being intimately mixed with oil or other vehicle and being easily distributed when being brushed over relatively large surfaces.

The first named property, the hiding power of a pigment, is determined principally by the optical constants of the pigment; in white or light colored pigments by the refractive index thereof.

The hiding power of a pigment may be considered as a property of its index of refraction in that the light passing through the vehicle onto a particle of the pigment is reflected either from its upper surface, its lower surface, its interior (if the particle is not homogeneous), or from some other combination thereof. If the particle is homogeneous the amount of light reflected depends upon the difference between the index of refraction of the pigment and the index of refraction of the vehicle. If the particle is not homogeneous the difference between the refraction of its components is also of importance. The greater these differences become, the greater is the amount of light reflected on its passage through a separation surface, and the greater will be the hiding power of the pigment. Accordingly, under the same conditions, that pigment will possess the best hiding power whose index of refraction differs most from the index of refraction of the vehicle. The following table will illustrate this phenomenon. The figures of the table are taken partly from the literature, and where no data were available, are supplied from my own investigations and measurements. The figures refer to the index of refraction of the substance in question toward air and with sodium light.

The indices of refraction are for anisotropic substances calculated according to the following formulas:

$$\frac{2\omega + \epsilon}{3} \text{ and } \frac{\alpha + \beta + \gamma}{3}$$

in which $\omega$ represents the refractive index for the ordinary ray of light vibrating along all directions perpendicular to the optic axis, and $\epsilon$ the refractive index of the extraordinary ray of light vibrating parallel to the optic axis in uniaxial crystals; and $\alpha$, $\beta$ and $\gamma$ represent the three characteristic indices of refraction for rays in biaxial crystals.

The data are to a degree approximate as the measurements on the crystalline modifications were made on natural crystals probably containing more or less impurities.

|   | Refractive index. | Difference from the refractive index of linseed oil. |
|---|---|---|
| Linseed oil (after drying of the coating)... | 1.50 |  |
| Barium sulfate | 1.64 | 0.14 |
| Amorphous titanic acid hydrate, $TiO_2 \times H_2O$ (about) | 1.9 | 0.4 |
| Amorphous titanium dioxid (about) | 2.2 | 0.7 |
| Crystalline titanium dioxid: |  |  |
| a. Anatase-modification | 2.52 | 1.02 |
| b. Brookite-modification | 2.64 | 1.14 |
| c. Rutile-modification | 2.71 | 1.21 |

These figures are useful in connection with the above explanation to show the superiority of the crystalline titanium dioxid (more especially of the rutile modification) in hiding power over the titanic hydroxid and the amorphous titanium dioxid.

It is probable that a high double refraction of a pigment effects an increase in the hiding power in that such double refraction will produce differences in refraction for differently positioned grains of one and the same substance. An example of this is known in the so-called liquid crystals which assume an opaque turbid appearance, on account of their property of reflecting and distributing the light through their entire mass due to the varied positioning of double refracting particles.

A synopsis of the power of the double refraction of the various titanium oxygen compounds and their modifications, is contained in the following tables which I have prepared.

*Difference between the highest and lowest refractive index for sodium light.*

| | |
|---|---|
| Amorphous titanic acid hydrate, $TiO_2 \times H_2O$ | 0.00 |
| Amorphous titanium dioxid | 0.00 |
| Anatase-modification | 0.97 |
| Brookite-modification | 0.16 |
| Rutile-modification | 0.29 |

As is evident from the above, the crystalline modifications, especially rutile, are superior to the amorphous compounds in double refractive properties as well as in having higher refractive indices. By reason of this, the crystalline titanium oxygen compounds possess greater hiding power and in this respect are much superior to the amorphous titanium oxygen compounds as a pigment.

But crystalline titanium compounds as they occur in nature are not suitable for use as pigments, and when pulverized mechanically into sufficiently small particles, these are of an uneven size and present a jagged surface which renders them unsatisfactory for this purpose. Moreover, crystalline titanium compounds, as found in nature, are associated with other substances so that when used as a pigment they exhibit colors, as for example, red, brown, gray or black, and for this reason are also of comparatively little value.

On the other hand there are several amorphous titanium compounds which are free from the unfavorable external structural difficulties above set forth, in that usually they can be produced in the form of small globules of a more uniform and suitable size which can be mixed evenly with a vehicle (such as linseed oil) and which are in this respect very well adapted to be applied on relatively large surfaces. This is more especially the case with the titanic hydroxid and with the amorphous titanium dioxid obtained therefrom by means of heating.

There is another consideration to be spoken of later which must not be overlooked and that is the stability of a pigment to light.

So far as hiding power and external structural suitability are concerned it is obviously desirable to obtain a pigment which possesses approximately the same hiding power as natural titanium crystals and the external properties of the amorphous modifications without possessing the defective properties of either. I have put forth efforts to solve this problem and have made the discovery that amorphous titanium oxygen compounds can by a certain process be converted into a crystalline form, which possesses a more advantageous structure than any crystalline titanium compound hitherto employed.

Furthermore as set forth in my other applications, Sr. No. 156,984, filed March 23, 1917 and Sr. No. 167,837, filed May 10, 1917, (the latter being now Patent 1,343,447, dated June 15, 1920) a complex pigment containing particles of a titanium oxygen compound in a crystalline form, as above stated, and another substance of a different refractive power is particularly suitable for use as a pigment, and it is desirable that the difference in the refractive powers of the titanium compound and the other substance be as great as possible.

In carrying out my process, diminutive crystals of titanium dioxid are first formed in the particles of the compounds, and these on continued treatment increase in number. In the preferred form the treatment ceases before the number is diminished and the size increased, as would be the case if the treatment were carried beyond this preferred point.

I have found that a suitable method of transforming titanium oxygen compounds from an amorphous to such a crystalline state consists in heating the amorphous compound to a temperature sufficient to produce this cryptocrystalline structure. I am aware that it has been proposed to heat titanium oxygen compounds for the purpose of eliminating combined water and other impurities which are driven off before or on reaching the temperature at which the combined water is driven off, but heating to a temperature merely sufficient to accomplish this does not result in the transformation desired and my invention contemplates heating to a temperature above that just recited. I have discovered that the crystallization of my product is not interfered with by the presence of other pigments during the heating process and that such foreign substances as, for instance, the compounds of alkaline earth metals, particularly the sulfates of barium and calcium, may be present in admixtures or in the form of solid solutions with the titanium compounds during the heating. I have further discovered that the desired type of crystallization may be accelerated by the presence during the heating process of a catalyst such as a halogen compound. When a catalyst is thus employed I prefer to use one which will volatilize during the calcining of the mixture. For this purpose zinc chlorid or ammonium fluorid is suitable.

The calcining of the materials employed can of course be effected in the ordinary method in any well known calcining furnace capable of withstanding the heat employed.

As the broadest aspect of this invention is the changing of amorphous titanium dioxid or compounds containing titanium and oxygen into a cryptocrystalline modification by heating, and the product effected thereby, the details of carrying out the process may vary with the material with which the process is started. This is of course obvious to those skilled in the art, and in the following illustration economy is had in mind as well as the product itself.

Assume that there is available for conversion a quantity of titanium dioxid or hydrate either alone or with various proportions of titanium sulfate, barium sulfate or calcium sulfate either singly or together, either mechanically mixed, or partly or wholly, in the form of a solid solution the whole being in the form of a slime. Now I have found that the transformation of the titanium content or part of it to a cryptocrystalline state can be effected even if the material used is a solid solution of titanium dioxid or its hydrate with sulfate of titanium, calcium or barium either singly or together. The particles of the material selected after the proper heating comprise a cryptocrystalline mass of titanium dioxid embedded in a matrix which contains the sulfates of the alkaline earth metals if originally present. If it is desired to accelerate the process of crystallization a small percentage of a halogen compound such as zinc chlorid or ammonium fluorid (say about five per cent.) is added to the slime. The slime is then run into a furnace, preferably of the rotary type similar to those employed in the cement industry, and brought up to the temperature required to produce the product sought for. It is obviously preferable to regulate the feed of the material through the furnace and the temperature of the furnace so that the desired degree of crystallization has taken place at the time the material passes through the furnace.

A convenient method of determining the point at which the calcining should stop is by means of microscopic examination. Samples taken from the calcining furnace during the calcination readily display the degree of crystallization under microscopic observation between crossed nicols and when the latter discloses the desired stage the calcining should at once be arrested. The temperature at which it is desired to arrest the calcination depends somewhat on the degree of crystallization desired. Experiments have shown that in carrying out the invention on a commercial scale a temperature ranging between 900° and 1000° C. will produce desirable results.

My experience has been, that the calcined materials may be more or less in an agglomerated condition. When this is true, they may be crushed or ground into a product of the required fineness, if it be desired to use the product in the form of a powder.

In the drawings which form a part of this application I have illustrated the different forms of titanium dioxid as they appear when viewed under the microscope. These drawings are magnified a thousand diameters.

Figure 1:
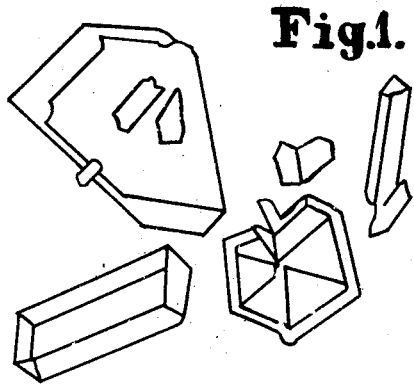
Figure 1 illustrates crystals of rutile which is a crystalline form of $TiO_2$.
Figure 2:
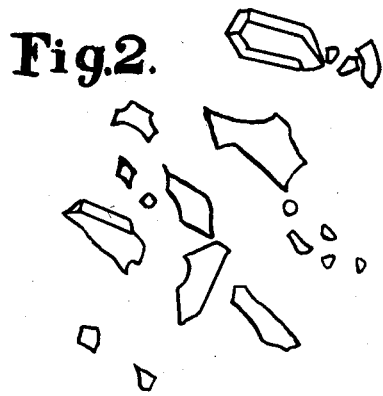
Fig. 2 illustrates the crystals of Fig. 1 after they have been mechanically pulverized.
Figure 3:
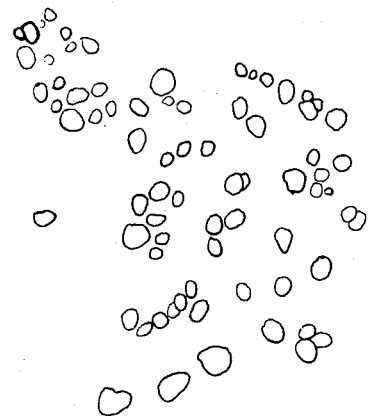
Fig. 3 illustrates amorphous titantic hydroxid particles.
Figure 4:
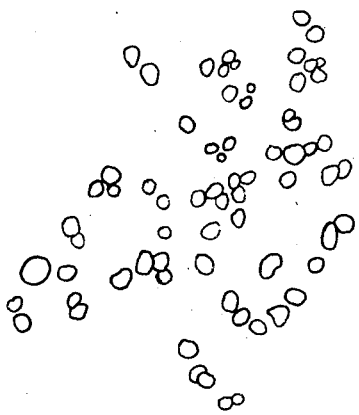
Fig. 4 illustrates amorphous dioxid particles made by calcination of the substance shown in Fig. 3.
Figure 5:
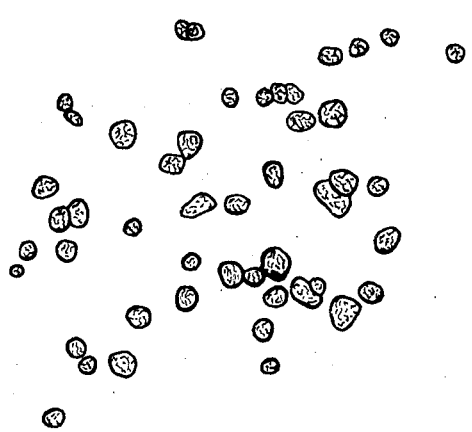
Fig. 5 illustrates the crystalline titanium dioxid particles produced in accordance with my invention, by further heating to 950° C. of the substance shown in Fig. 4.

From these drawings it will be observed that the particles of titanium dioxid obtained in accordance with my process are characterized by crystallization in which the crystals are exceedingly small, that the particles are minute, comparable in this respect with amorphous titanium dioxid particles illustrated and that they do not possess the external irregularities of the pulverized rutile which render the use of rutile as a pigment impractical.

The product varies from white to light yellow in color. It has a high refractive index approaching in this respect rutile. When used as a pigment and ground with oil or other vehicle it forms a paint characterized by having exceedingly great hiding power and thus is superior to one in which the titanium is present solely in the amorphous modification.

Furthermore the crystallization process has also a very advantageous effect in increasing the stability of titaniferous pigments against the action of light. My crystalline pigments are practically stable against light in the presence of organic substances, while amorphous pigments, unless first submitted to stabilization processes, are not at all stable under these conditions.

The extent to which the process is carried, that is to say, the extent to which the titanium content is changed into the crystalline state above described, may be varied, a perceptible improvement in the product over one in which the titanium content is present entirely in the amorphous form thereof having been observed when crystallization has taken place to but a slight extent. But I prefer that the treatment be prolonged until the amorphous titanium compounds are entirely converted into crypto-crystalline compounds of the character above described. The product obtained by the described treatment of the specified materials comprises crypto-crystalline titanium dioxid of a high refractive index and intermingled therewith material having a lower refractive index, and is thus a complex pigment. If titanium dioxid alone is heated and its crystallization is not carried to completion, the product consists of titanium dioxid in different modifications, whereas if the material heated consists of titanium dioxid and other substances, the product consists of different substances and not merely different modifications of the same substance.

The foregoing detailed description has been given for clearness of understanding and no undue limitation should be deduced therefrom, but the appended claims should be construed as broadly as permissible in view of the prior art.

What I claim as new and desire to secure by Letters Patent of the United States is:

1. The process of effecting crystallization in a titanium compound which consists in heating a compound of titanium until the particles constituting the structure exhibit a crystalline interior structure and a smooth exterior surface.

2. In the production of a material suitable for use as or in the manufacture of a pigment and containing a titanium oxygen compound, the process of effecting cryptocrystallization in said compound, which consists in heating a compound of titanium containing oxygen to a sufficiently high temperature to effect said crystallization.

3. In the production of a pigment containing a titanium compound, the process of effecting crystallization in said compound, which consists in heating a compound of titanium in the presence of a catalyst to a sufficiently high temperature to produce said crystallization.

4. In the production of a pigment containing a titanium compound, the process of effecting crystallization in said compound, which consists in heating a pigment forming compound of titanium together with a compound of an alkaline earth metal to a sufficiently high temperature to produce said crystallization.

5. In the production of a pigment containing a titanium compound, the process of effecting crystallization in said compound, which consists in heating a pigment forming compound of titanium together with a compound of an alkaline earth metal in the presence of a catalyst to a sufficiently high temperature to produce said crystallization.

6. In the production of a pigment containing a titanium oxygen compound, the process of effecting crystallization in said compound, which consists in heating a compound of titanium together with the sulfate of an alkaline earth metal to a sufficiently high temperature to effect said crystallization.

7. In the production of a pigment containing a titanium oxygen compound, the process of effecting cryptocrystallization in said compound, which consists in heating a compound of titanium together with the sulfate of an alkaline earth metal in the presence of a halogen compound to a sufficiently high temperature to effect the said crystallization.

8. The process of effecting crystallization in a solid solution of a titanium oxygen compound and a compound of an alkaline earth metal, which consists in heating an amorphous solid solution of a titanium oxygen compound and a compound of an alkaline earth metal to a sufficiently high temperature to produce said crystallization.

9. The process of effecting cryptocrystallization in a solid solution of titanium oxid and the sulfate of an alkaline earth metal, which consists in heating an oxygen compound of titanium, water, sulfuric anyhdrid and an alkaline earth oxid, all in mutual solid solution to a temperature ranging substantially from 900 to 1000° C.

10. In the production of a pigment comprising a titanium oxygen compound, the process of effecting stability of the pigment against the action of heat and light, which consists in heating an oxygen compound of titanium to temperatures ranging from substantially 900° C. upward, substantially as described 11. The process of producing a complex pigment containing an artificially crystallized titanium oxygen compound and a pigment forming substance of different refractive index therefrom, which comprises heating a compound of titanium containing oxygen together with the said substance to a sufficiently high temperature to effect crystallization in the titanium oxygen compound.

12. The process of producing a complex pigment containing artificially crystallized titanium oxid and a pigment forming compound of an alkaline earth metal having a different refractive index therefrom, which comprises heating a compound of titanium containing oxygen together with the alkaline earth metal compound to a sufficiently high temperature to effect crystallization in the titanium oxid.

13. The process of producing a complex pigment containing artificially crystallized titanium oxid and a sulfate of an alkaline earth metal having a different refractive index therefrom, which comprises heating a compound of titanium containing oxygen together with the said sulfate to a sufficiently high temperature to effect crystallization in the titanium oxid.

14. The process of producing a complex pigment containing artifically crystallized titanium oxid and calcium sulfate, which comprises heating a compound of titanium containing oxygen together with the said calcium sulfate to a sufficiently high temperature to effect crystallization in the titanium oxid.

15. The process of producing a complex pigment comprising titanium oxid characterized by being partly amorphous and partly crystalline in structure and intermingled therewith a pigment forming compound of another metal, which consists in heating a compound of titanium containing oxygen together with the said metal compound to a sufficiently high temperature to effect partial crystallization in the titanium oxid.

16. As a new and useful article of manufacture a pigment comprising an oxygen compound of titanium in crystalline form, the crystals of which are relatively small as compared with the particles of said compound.

17. As a new and useful article of manufacture a substance comprising an oxygen compound of titanium, the structure of its particles being partly amorphous and partly crystalline, the crystals thereof being small as compared with the said particles.

18. As a new and useful article of manufacture, a substance comprising titanium dioxid in cryptocrystalline form, the index of refraction of which is greater than the index of refraction of amorphous titanium dioxid.

19. As a new and useful article of manufacture, a substance comprising titanium oxid, the particles of which exhibit a crystalline interior structure and a smooth exterior surface.

20. As a new and useful article of manufacture, a pigment comprising artificially crystallized titanium oxid and intermingled therewith a pigment forming compound of an alkaline earth metal.

21. As a new and useful article of manufacture, a pigment comprising an oxygen compound of titanium characterized by cryptocrystallization, and intermixed therewith a pigment forming compound of an alkaline earth metal.

22. As a new and useful article of manufacture, a pigment comprising an oxygen compound of titanium characterized by cryptocrystallization and intermixed therewith a substance containing a sulfate of an alkaline earth metal.

23. As a new and useful article of manufacture, a pigment comprising an oxygen compound of titanium characterized by being partly amorphous and partly crystalline in structure and intermixed therewith a mass containing the sulfate of an alkaline earth metal.

24. As a new and useful article of manufacture, a complex pigment comprising an oxygen compound of titanium characterized by cryptocrystallization and intermingled therewith a pigment forming compound of another element having a different refractive index therefrom.

25. As a new and useful article of manufacture, a complex pigment comprising an oxygen compound of titanium characterized by cryptocrystallization and intermingled therewith a pigment forming compound of an alkaline earth metal having a different refractive index therefrom.

26. As a new and useful article of manufacture, a complex pigment comprising an oxygen compound of titanium characterized by a partial crystallization and intermingled therewith a substance containing a sulfate of an alkaline earth metal having a different refractive index therefrom.

27. As a new and useful article, a material suitable for use as a pigment comprising principally titanium oxid in a crystalline modification and calcium sulfate.

Signed at Christiania, Norway, this 14th day September 1917.

VICTOR MORITZ GOLDSCHMIDT.